(12) United States Patent
Ciaramitaro et al.

(10) Patent No.: US 7,065,515 B2
(45) Date of Patent: Jun. 20, 2006

(54) SYSTEM AND METHOD FOR ELECTRONICALLY MANAGING COMPOSITE DOCUMENTS

(75) Inventors: Barbara L. Ciaramitaro, Grosse Pointe Woods, MI (US); Michael A. Gruskin, West Bloomfield, MI (US); Edward C. Wolfe, Bloomfield Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/884,009

(22) Filed: Jul. 2, 2004

(65) Prior Publication Data

US 2005/0010600 A1 Jan. 13, 2005

Related U.S. Application Data

(60) Provisional application No. 60/485,540, filed on Jul. 8, 2003, provisional application No. 60/484,731, filed on Jul. 3, 2003.

(51) Int. Cl.
*G06F 17/00* (2006.01)

(52) U.S. Cl. .......................................... 707/2; 707/101

(58) Field of Classification Search .................... 707/9, 707/10, 103, 104.1, 2, 101, 200, 205
See application file for complete search history.

(56) References Cited

U.S. PATENT DOCUMENTS

| 5,539,906 A | * | 7/1996 | Abraham et al. ............... 707/9 |
| 5,838,966 A | * | 11/1998 | Harlan .......................... 715/866 |
| 5,845,067 A | * | 12/1998 | Porter et al. .................. 713/200 |
| 5,887,171 A | * | 3/1999 | Tada et al. .................... 719/317 |
| 5,921,582 A | * | 7/1999 | Gusack .......................... 283/67 |
| 6,016,491 A | * | 1/2000 | Kou .............................. 707/9 |
| 6,160,549 A | * | 12/2000 | Touma et al. ................ 715/762 |
| 6,237,099 B1 | * | 5/2001 | Kurokawa ..................... 713/200 |
| 6,839,680 B1 | * | 1/2005 | Liu et al. ....................... 705/10 |
| 6,925,475 B1 | * | 8/2005 | Essafi et al. ................. 707/104.1 |
| 6,978,276 B1 | * | 12/2005 | Demsky et al. .............. 707/102 |
| 2002/0109707 A1 | * | 8/2002 | Lao et al. ..................... 345/700 |
| 2002/0120858 A1 | * | 8/2002 | Porter et al. ................ 713/200 |
| 2002/0147711 A1 | * | 10/2002 | Hattori et al. ................. 707/3 |
| 2003/0105739 A1 | * | 6/2003 | Essafi et al. ................... 707/1 |
| 2003/0126147 A1 | * | 7/2003 | Essafi et al. ................. 707/100 |
| 2004/0205554 A1 | * | 10/2004 | Goswami et al. ........... 715/513 |

* cited by examiner

*Primary Examiner*—Safet Metjahic
*Assistant Examiner*—Brian Goddard
(74) *Attorney, Agent, or Firm*—Kathryn A. Marra

(57) ABSTRACT

A system and method for electronically managing composite documents including a repository of electronically stored individual documents, where a subset of the individual documents are associated with other individual documents to form composite documents. A search tool is also provided for locating a selected individual document, where the selected individual document is associated with a selected composite document. A selection tool for selecting a function to be applied to the selected individual document includes an option to apply the function to other individual documents within the selected composite document. This allows the selected individual document to be operated on individually or with the other individual documents within the selected composite document.

42 Claims, 10 Drawing Sheets

FIG. 10

Associate [1000]

Production Decision:
- ○ Individual Review (No Decision)
- ● Hold without Review
- ○ Do Not Produce without Review
- ○ Retain Decisions from Prior Production
- ○ Produce without Review Production Decision:
Reviewer Role:
Reviewer Name:

Hold Reasons:
Further Review Required
Illegible
Missing Pages
Responsiveness
Redaction Production Decision Comments

[Cancel] [< Back] [Next >] [Finish]

*LSA will insert a "Hold without Review"-specific Additional Information Frame*

SYSTEM AND METHOD FOR ELECTRONICALLY MANAGING COMPOSITE DOCUMENTS

CROSS REFERENCE TO RELATED APPLICATIONS

This application claims priority to U.S. Provisional Application Ser. No. 60/484,731, filed Jul. 3, 2003 and to U.S. Provisional Application Ser. No. 60/485,540, filed Jul. 8, 2003, which are incorporated by reference herein in their entirety.

BACKGROUND OF THE INVENTION

The present disclosure relates generally to managing composite documents and, in particular, to a system and method for electronically managing composite documents for litigation support.

Legal matters often involve large volumes of information that must be organized and categorized in response to particular inquires or issues, such as litigation pleadings, business transactions, government regulations, and other legal matters. The information is typically managed by a centralized organization, such as a legal department or group therein having document coordinators. Managing this legal information often requires organizing both textual information as well as documents.

Current litigation support systems are generally designed to support retrieval of information based on document attributes such as document date, type of document, authors, etc. Therefore, when documents are prepared for loading into litigation support systems, their document composition is defined based on these attributes. For example, a change in document date would signify the start of a new document. However, real-world documents often consist of more than one document unit included as attachments to a leading document. These combined documents are referred to as composite documents in that they include more than one sub-document. In a litigation support system, it is important to keep the context of the original composite document intact including all of its sub-documents. It is also important to allow review and use of the entire document or any of its individual sub-units.

For example, a composite document may comprise ten documents, each one providing results of testing performed on a product for a specific year, whereby the composite spans a ten-year period (e.g., 1991–2000). The test results for each document may be considered independently from the other test results in that they provide useful information for testing performed during a particular one-year period. In addition, the test results may also be useful in the context of the ten year period covered by the collection of documents in evaluating the long-term performance of a product (e.g., pattern spotting).

Litigation support systems typically support the concept of composite documents in that documents and their attachments are tracked in the system. However, they do not provide the ability to present the entire composite document and to allow the user to retrieve, review or otherwise manipulate all or selected sub-document units of the composite documents. It would be desirable for a litigation support system to allow a composite document to be treated as a single document and for each sub-document to be treated as an individual document.

BRIEF DESCRIPTION OF THE INVENTION

According to one aspect of the invention, a system and method are provided for electronically managing composite documents including a repository of electronically stored individual documents, where a subset of the individual documents are associated with other individual documents to form composite documents. A search tool is also provided for locating a selected individual document, where the selected individual document is associated with a selected composite document. A selection tool for selecting a function to be applied to the selected individual document includes an option to apply the function to other individual documents within the selected composite document. This allows the selected individual document to be operated on individually or with the other individual documents within the selected composite document.

In another aspect of the invention, a system and method are provided for electronically managing composite documents including a repository of electronically stored individual documents, where a subset of the individual documents are associated with other individual documents to form composite documents. A search tool is provided for locating a selected individual document, where the selected individual document is associated with a selected composite document and a selected folder. In addition, a selection tool is provided for selecting a function to be applied to the selected individual document includes an option to apply the function to other individual documents within the selected composite document that are in the selected folder. This allows the selected individual document to be operated on individually or with the other individual documents within the selected composite document.

In a further aspect of the invention, a system and method are provided for electronically managing composite documents including a repository of electronically stored individual documents, where a subset of the individual documents are associated with other individual documents to form composite documents. A search tool is provided for locating a selected individual document, where the selected individual document is associated with a selected composite document and a selected folder. In addition, a selection tool is provided for selecting a function to be applied to the selected individual document includes an option to apply the function to other individual documents within the selected composite document that are in the selected folder. The function includes one or more of copying, associating, printing, viewing, applying protection, proposing a privilege category, proposing a privilege treatment, applying a production decision and reporting. This allows the selected individual document to be operated on individually or with the other individual documents within the selected composite document.

BRIEF DESCRIPTION OF THE DRAWINGS

Referring to the exemplary drawings wherein like elements are numbered alike in the several FIGURES:

FIG. 10 is an exemplary user interface screen for applying a production decision to a document.

DETAILED DESCRIPTION OF THE INVENTION

Figure 1:
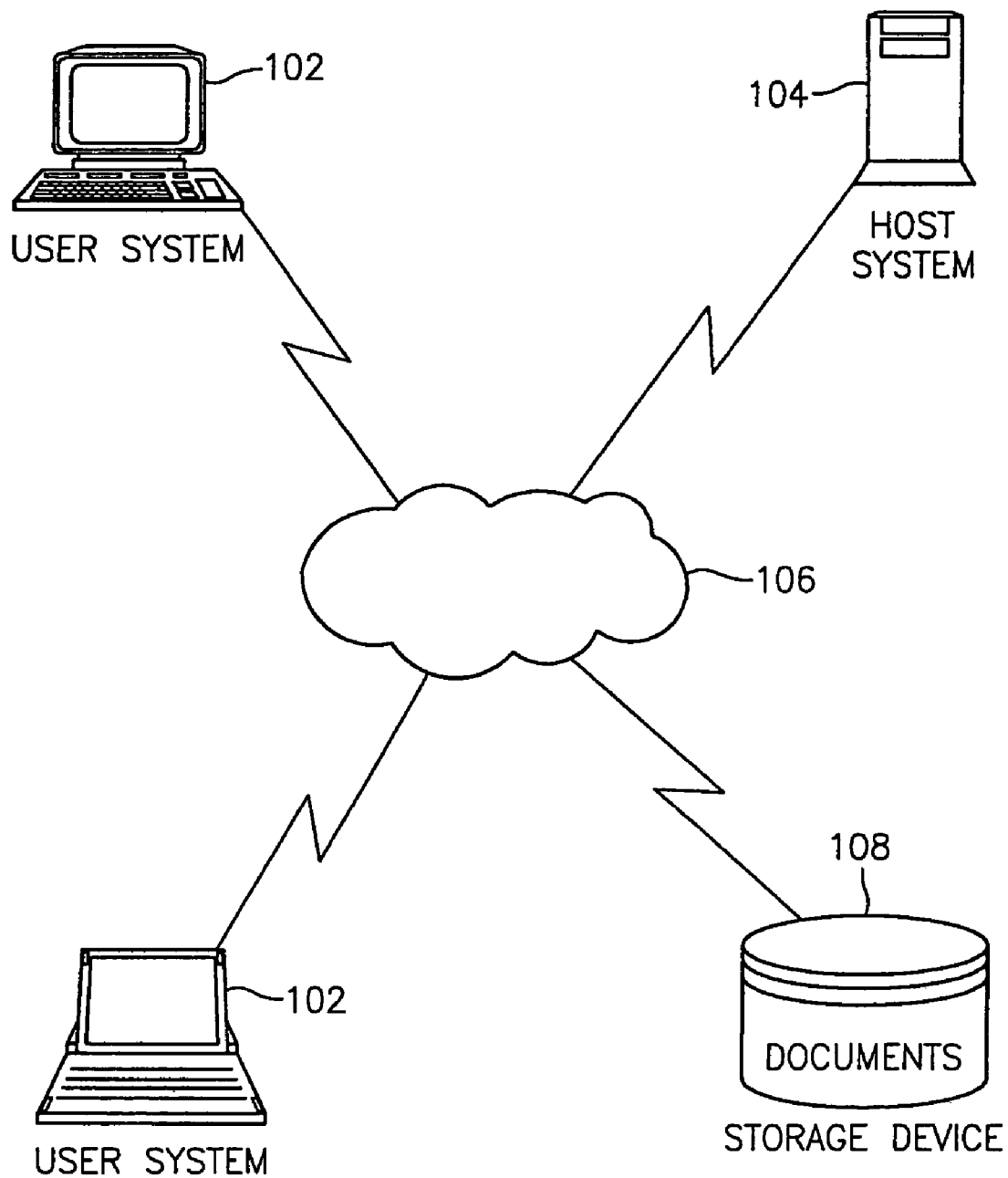
FIG. 1 is a block diagram of an exemplary system for managing composite documents.

Referring to FIG. 1, a block diagram of an exemplary system for managing composite documents is generally shown. The system includes a litigation support application (LSA) that is executed by one more computer programs located on a host system 104. The LSA manages litigation information and provides computer processes to perform activities in support of legal matters. In particular, the LSA supports the collection, storage, retrieval and review of discovery information for litigation, regulatory or other matters where discovery information needs to be assembled. Discovery information includes documents that may be in any form such as drawings, photographs, test results, reports, memos, letters, data, transcripts, manuals, computer files and records.

Referring to FIG. 1, the host system 104 executes computer instructions for performing composite document management functions. A composite document includes two or more individual documents that may be considered separately or as a single unit. The system depicted in FIG. 1 includes one or more user systems 102 through which users at one or more geographic locations may contact the host system 104. The user systems 102 are coupled to the host system 104 via a network 106. Each user system 102 may be implemented using a general-purpose computer executing a computer program for carrying out the processes described herein. The user systems 102 may be personal computers (e.g., a lap top, a personal digital assistant) or host attached terminals. If the user systems 102 are personal computers, the processing described herein may be shared by a user system 102 and the host system 104 (e.g., by providing an applet to the user system 102).

The network 106 may be any type of known network including, but not limited to, a wide area network (WAN), a local area network (LAN), a global network (e.g. Internet), a virtual private network (VPN), and an intranet. The network 106 may be implemented using a wireless network or any kind of physical network implementation known in the art. A user system 102 may be coupled to the host system through multiple networks (e.g., intranet and Internet) so that not all user systems 102 are coupled to the host system 104 through the same network. One or more of the user systems 102 and the host system 104 may be connected to the network 106 in a wireless fashion. In one embodiment, the network is an intranet and one or more user systems 102 execute a user interface application (e.g. a web browser) to contact the host system 104 through the network 106. In another exemplary embodiment, the user system 102 is connected directly (i.e., not through the network 106) to the host system 104 and the host system 104 is connected directly to or contains the storage device 108.

The storage device 108 includes a data repository with data relating to managing composite documents and may be implemented using a variety of devices for storing electronic information. It is understood that the storage device 108 may be implemented using memory contained in the host system 104 or that it may be a separate physical device. The storage device 108 is logically addressable as a consolidated data source across a distributed environment that includes a network 106. Information stored in the storage device 108 may be retrieved and manipulated via the host system 104 and/or via the user system 102. The data repository includes one or more databases containing documents in support of litigation. The documents in the databases are typically scanned documents that are stored as images. These documents may be classified as composite documents and/or individual components of a composite document.

Individual documents that comprise a composite document are coded upon entry into the data repository (e.g., by a centralized group of document entry coordinators). The coding includes assigning a document type, an accession range, and an attachment range to each document. Each of the components (also referred to herein as 'individual documents') that constitute a composite document are assigned a unique accession range and will share a common attachment range. The accession range is the page numbers associated with the individual document within the composite document (e.g., 005–008). The attachment range is the number of pages associated with the entire composite document (e.g., 001–020). The document type describes the source document and may include a value such as drawing, photograph, test result, report, memo, letter, data, transcription, manual, computer file, record, etc. By using the document type, accession range and attachment range in this manner, the computer programs are able to perform various functions on the composite document and/or its individual components.

Databases within the data repository on the storage device 108 are contained in either a privileged schema or a non-privileged schema. The privileged schema contains documents that have been classified as privileged. For documents that were originally in the non-privileged schema and subsequently moved to the privileged schema, a placeholder indicating that the document has been removed for privilege may remain in the non-privileged schema. The non-privileged schema contains documents that have been classified as non-privileged. In addition, documents may be classified as partially privileged and include portions that are privileged and portions that are non-privileged. For partially privileged documents, a copy of the document with the privileged portions removed is stored in the non-privileged schema (along with a placeholder for each portion of the document that has been removed) and a full copy of the document is stored in the privileged schema. Access to the privileged and non-privileged schemas is based on the security levels associated with individual users. In exemplary embodiments of the present invention, the host system 104 operates as a database server and coordinates access to application data including data stored on the storage device 108. A detailed description of the invention of LSA having the privileged and non-privileged schema with appropriate document treatment is found in commonly assigned patent application entitled "System and Method for Electronically Managing Privileged and Non-Privileged Documents", filed the same day as the present application, Jul. 2, 2004 and which is herein incorporated by reference in its entirety.

The host system 104 depicted in FIG. 1 may be implemented using one or more servers operating in response to a computer program stored in a storage medium accessible by the server. The host system 104 may operate as a network server (e.g., a web server) to communicate with the user system 102. The host system 104 handles sending and receiving information to and from the user system 102 and can perform associated tasks. The host system 104 may also include a firewall to prevent unauthorized access to the host system 104 and enforce any limitations on authorized access. For instance, an administrator may have access to the entire system and have authority to modify portions of the system. A firewall may be implemented using conventional hardware and/or software as is known in the art.

The host system 104 may also operate as an application server. The host system 104 executes one or more computer programs to provide composite document management functions. Processing may be shared by the user system 102 and the host system 104 by providing an application (e.g., java applet) to the user system 102. Alternatively, the user system 102 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

Figure 2:
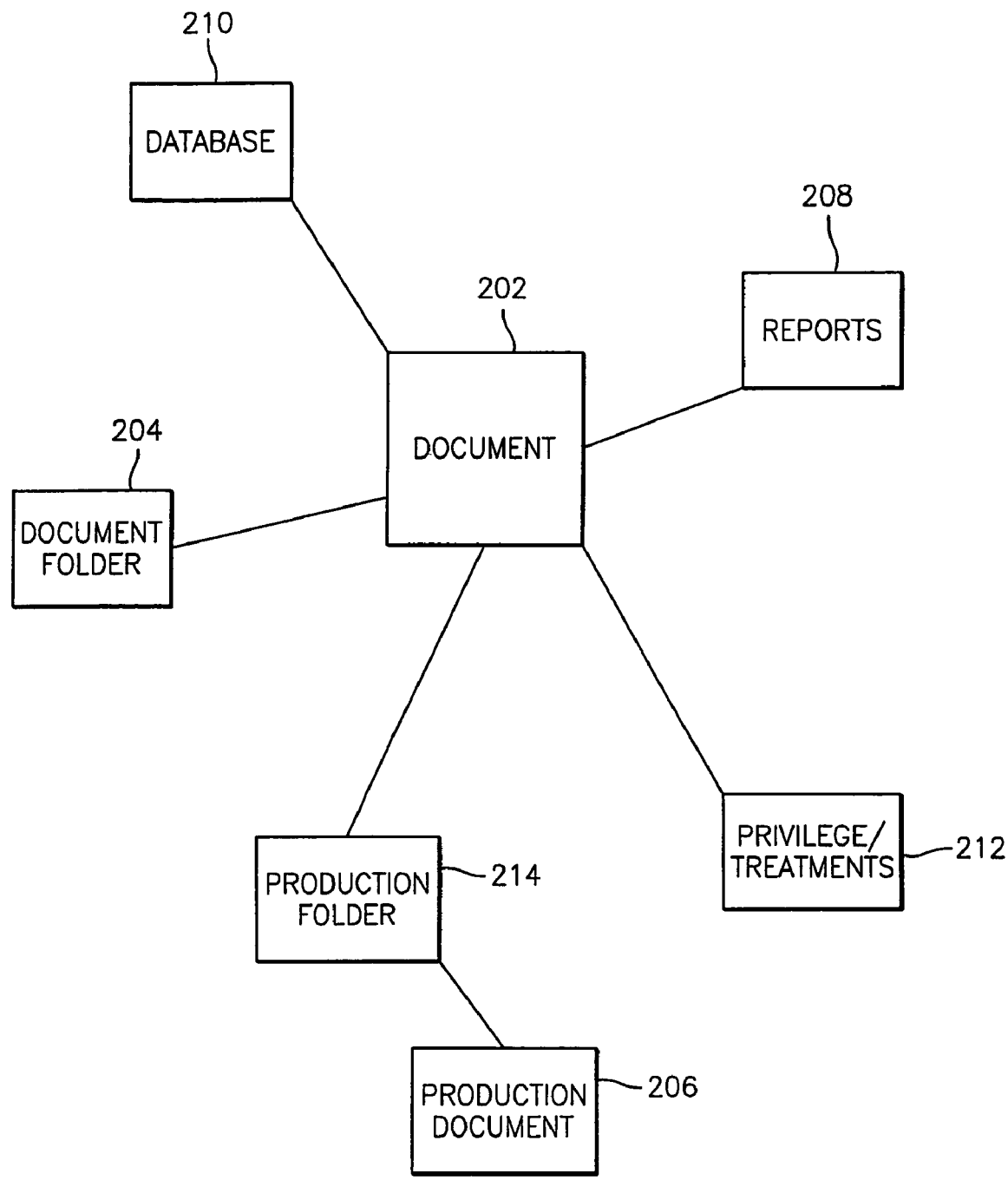
FIG. 2 is a block diagram of database tables utilized by exemplary embodiments of the present invention.

FIG. 2 is a block diagram of database tables stored in the data repository on the storage device 108 and utilized by exemplary embodiments of the present invention. The document table 202 includes a record for each document. In an exemplary embodiment of the present invention the document table 202 includes fields for: a unique document identifier; a document type (e.g., memo, letter, and photograph); a case number, product information; issue information; privilege information; and protection information. If the document is a composite document or a component of a composite document, the document table 202 will also include fields for an accession range that specifies the boundaries of an individual document and an attachment range which identifies the boundaries of the composite document (e.g., all document components). A typical document table 202 may include over a hundred fields for searching on characteristics of the document, the examples described herein represent a subset of these fields.

Documents are reviewed and decisions (e.g., production status, privilege status and privilege category) applied to documents by users with access to the LSA as well as by remote reviewers who do not have access to the LSA. A detailed description of the invention of LSA for remote review of documents is found in commonly assigned patent application entitled "System and Method for Electronically Managing Remote Review of Legal Documents", filed the same day as the present application Jul. 2, 2004 and which is herein incorporated by reference in its entirety. Also advantageously, the LSA allows the user to adopt documents and their prior decisions, such as decisions associated with a similar prior production instance, so that additional review of the same documents is not required. This feature is enabled since the LSA beneficially stores all documents and all historical prior decisions associated with the documents, thereby enabling efficiency of document identification by the LSA user and expedited review of documents relating to similar type of legal matters or production instances. A detailed description of the invention of LSA having this feature is found in commonly assigned patent application entitled "System and Method for Electronically Managing Discovery Pleading Information", filed the same day as the present application Jul. 2, 2004 and which is herein incorporated by reference in its entirety.

The privilege/treatments table 212 contains data related to the privilege status of the document. There is one record in the privilege/treatments table 212 for each document in the document table 212. Privilege information includes both privilege categorization (e.g., privileged, partially privileged and non-privileged) and privilege treatments (e.g., attorney work product doctrine (AWPD) and attorney client privilege (ACP)). A privilege category is a general description of the level of privilege ascribed to a document. A document is assigned a status of privileged if, for example, it relates to a private communication between a client and a legal entity. Protection information refers to a level of protection that should be afforded a document. For example, the contents of a document may include sensitive information that relates to the internal operations and policies of the entity. The entity may wish to protect this content from external sources and/or specified internal sources. Accordingly, a document may be classified as protected or unprotected. A protected document may be further classified as "confidential" or "secret", with the latter being given a higher degree of security.

Also shown in FIG. 2 is a document folder table 204 to specify the connection between a document (e.g., a composite document) and one or more document folders. A document folder refers to a collection of documents that are grouped by the user into a specific folder. These documents may be related to a single case and/or to a single issue or by any other user specified relationship. A subset of the fields in the document folder table 204 include a unique folder identifier, a document identifier and a database identifier for the folder. Document records in the LSA are categorized into two separate instances: the master instance, which is the permanent or default copy of the document stored in the document table 202, and the production instance, which is a copy of the document used for a particular production. A production refers to discovery information that is delivered to an opposing counsel in response to a request for information. Each document has only one master instance; however, each time a document is associated to a production folder via the production folder table 214, a new and unique production instance is created for that document. The document table 202 provides fields for managing the master instances of these documents and a subset of the fields in the document table 202 may be designated as master status fields. When master status fields are updated in the master instance of the document, these fields are also updated in any production instances of the document.

FIG. 2 also depicts a production folder table 214. A production folder refers to a grouping of documents produced or proposed for production. The grouping of folders may be similarly related to one another as described above with respect to the document folder. The documents in a document folder have not been produced while the documents in a production folder have been produced or have been proposed for production. The production folder table 214 includes fields such as: a unique production document identifier, a production folder identifier, a production identifier, a document identifier that points to the source document in the document table 202 (referred to in the production process as the master document), a production privilege category, and a protection status.

Also shown in FIG. 2 is a production document table 206 that includes similar fields as provided in the document table 202, except that the fields relate to production instances of the documents. A reports table 208 includes fields for providing various reporting features associated with composite documents and their components. Reports may be generated by searching various fields provided in the document table 202 above. The database table 210 includes fields to associate a document to a particular database. A subset of the possible fields in the tables depicted in FIG. 2 have been described and may be utilized to manage composite documents.

Figure 3:
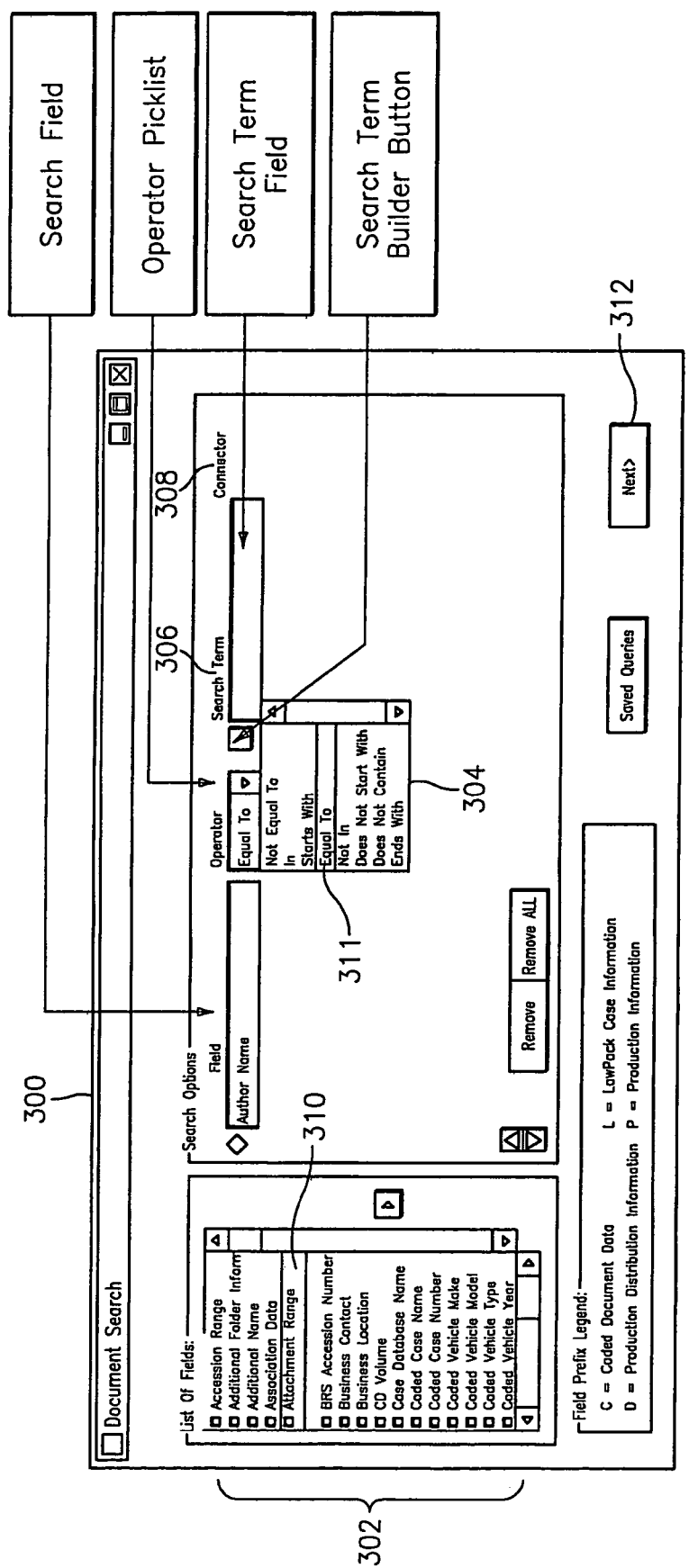
FIG. 3 is an exemplary user interface screen for searching and retrieving composite documents.

As indicated above, once a composite document or composite document component has been coded (e.g., assigned a document type, accession range, and attachment range) and input into the data repository on the storage device 108, various functions are enabled by the LSA. A document search may be performed (e.g., using a search tool) via a user interface screen, such as the one depicted in FIG. 3. The user may select from a list of available search fields 302 upon which to search, followed by selecting one or more search criteria (e.g., operators 304, search terms 306, and connectors 308) in the document search user interface screen 300. The search fields 302 may be sourced from fields located in the database tables depicted in FIG. 2. Multiple criteria may be selected for advanced search functionality. A user who desires to search for all components of a single composite document, for example, may search for these documents by attachment range field 310. If the user wishes to view all components of a composite document that have a document type of 'memo', the user selects the document type field (not shown) in the search fields 302, followed by selecting the operator 'equal to' 311 in the operator field 304 and also enters 'memo' in the search term field 306. The user then selects the 'next' button 312 and the LSA searches storage device 108 for all documents that match the criteria entered. The results of the search are presented to the user via a user interface screen such as the one depicted in FIG. 4.

Figure 4:
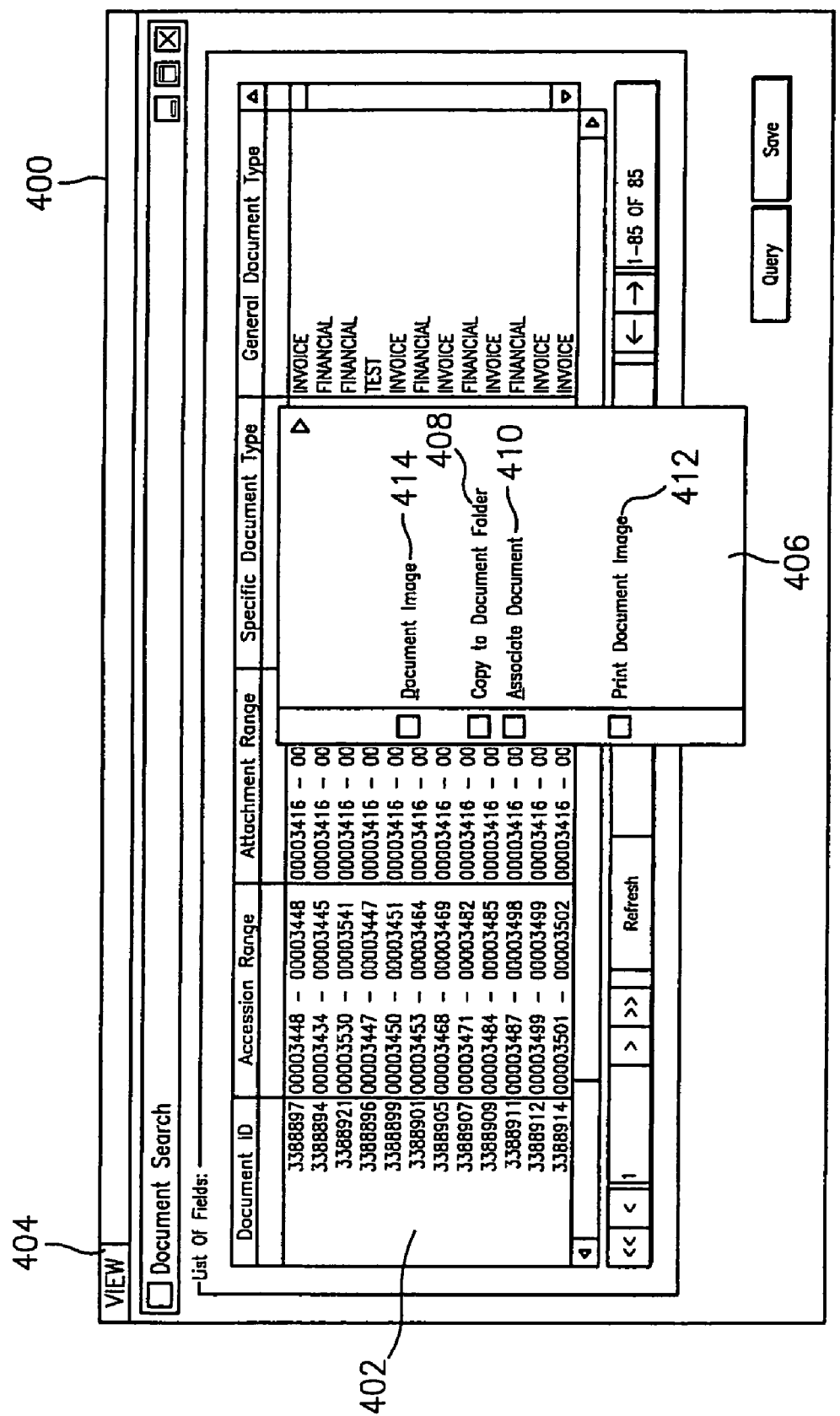
FIG. 4 is an exemplary user interface screen illustrating the results of a search performed via the user interface screen of FIG. 3.

The document information user interface screen 400 depicted in FIG. 4 includes a document grid 402 that provides a listing of documents and related document information such as a document identifier, accession range, attachment range, specific document type, and general document type, to name a few. The user may select one of the documents (e.g., by 'right-clicking' on a mouse or by selecting 'view' 404 in the toolbar of screen 400) which results in the display of subwindow 406 and a menu of functions available to the user. Functions that may be performed (e.g., via a selection tool) on the document via the subwindow 406 include: copy to document folder 408 (to copy the selected document to a folder), associate document 410 (to associate the selected document to a production folder), print document 412 and document image 414 (to view the selected document). These functions will now be described in further detail.

Figure 5:
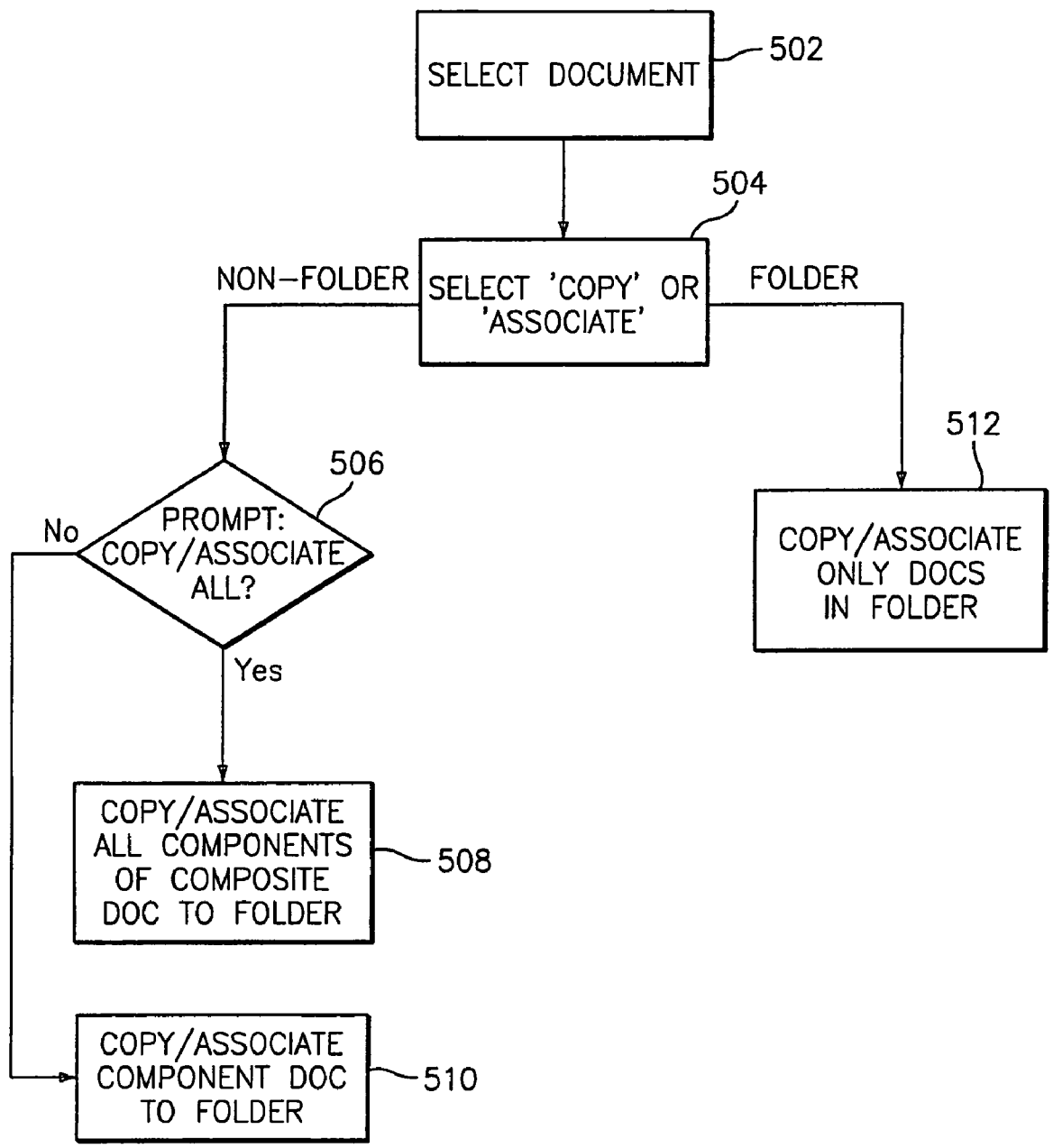
FIG. 5 is an exemplary flowchart describing a process for copying and/or associating composite documents to a folder.

When the user selects either copy document to folder 408 or associate document 410 from the subwindow 406 in FIG. 4, a process for copying and/or associating a document to a folder is initiated. An exemplary process for copying and/or associating a document to a folder is depicted in FIG. 5. Sample data for a composite document and its component documents are shown in the table below for use in describing the functions provided by the LSA with respect to FIG. 5.

| Accession Range | Attachment Range |
| --- | --- |
| 001–002 | 001–015 |
| 003–003 | 001–015 |
| 004–007 | 001–015 |

-continued

| Accession Range | Attachment Range |
| --- | --- |
| 008–008 | 001–015 |
| 009–012 | 001–015 |
| 013–015 | 001–015 |

Additionally, a table illustrating data pertaining to three component documents contained in both the composite document of the table above and a production folder are shown in the table below.

| Accession Range | Attachment Range |
| --- | --- |
| 001–002 | 001–015 |
| 004–007 | 001–015 |
| 008–008 | 001–015 |

At 502, the user selects a document to be copied or associated to a folder, as described previously in reference to FIG. 4. In addition, at 504, the user selects either copy to document folder 408 or associate document 410 from the subwindow 406 in FIG. 4. The same processing is performed for both the copy and associate functions with any exceptions noted herein. If the user has selected a composite document component (that is not currently associated with a folder) to be copied/associated, the LSA will prompt the user to determine if all related components of the composite document should be copied/associated to the folder at 506. If the user selects 'yes', the LSA will copy/associate all of the components (or individual documents) of the composite document to which the selected individual document belongs over to the folder at 508. Using the composite document table above, the LSA will copy/associate documents 001–002, 003—003, 004–007, 008—008, 009–012, and 013–015 to the folder. If the user selects 'no' (i.e., indicating the user does not wish to copy/associate all the component documents), the LSA will copy/associate only the selected document to the folder at 510.

A user may want to copy/associate a set of documents in a document folder (referred to herein as an 'originating folder') to another folder such as a document folder or production folder (referred to herein as a 'target folder'). A user is also permitted to copy a production folder to a second production folder. However, it is not permitted for a production folder to be copied to a document folder since the documents contained in the production folder have been produced and/or proposed for production and should be managed separately.

Referring to 504, if the user has selected an individual document within a composite document that is currently associated with a folder to be copied or associated to a target folder, then 512 is performed. At 512, the user is prompted to determine if the user requires that all of the other individual documents in the folder that are part of the same composite document as the selected individual document should be copied or associated to the target folder. The LSA prompts the user once and applies the response to all of the individual documents in the set (i.e., the user will not be required to make an individual determination for each component of the composite document). For purposes of illustration, the selected document is 001–002. Thus, because documents 001–002, 004–007, and 008—008 are all in the originating production folder of the table above, the LSA will associate documents 001–002, 004–007, and 008—008 to the desired target folder and will not prompt the user to associate the other components.

Figure 6:
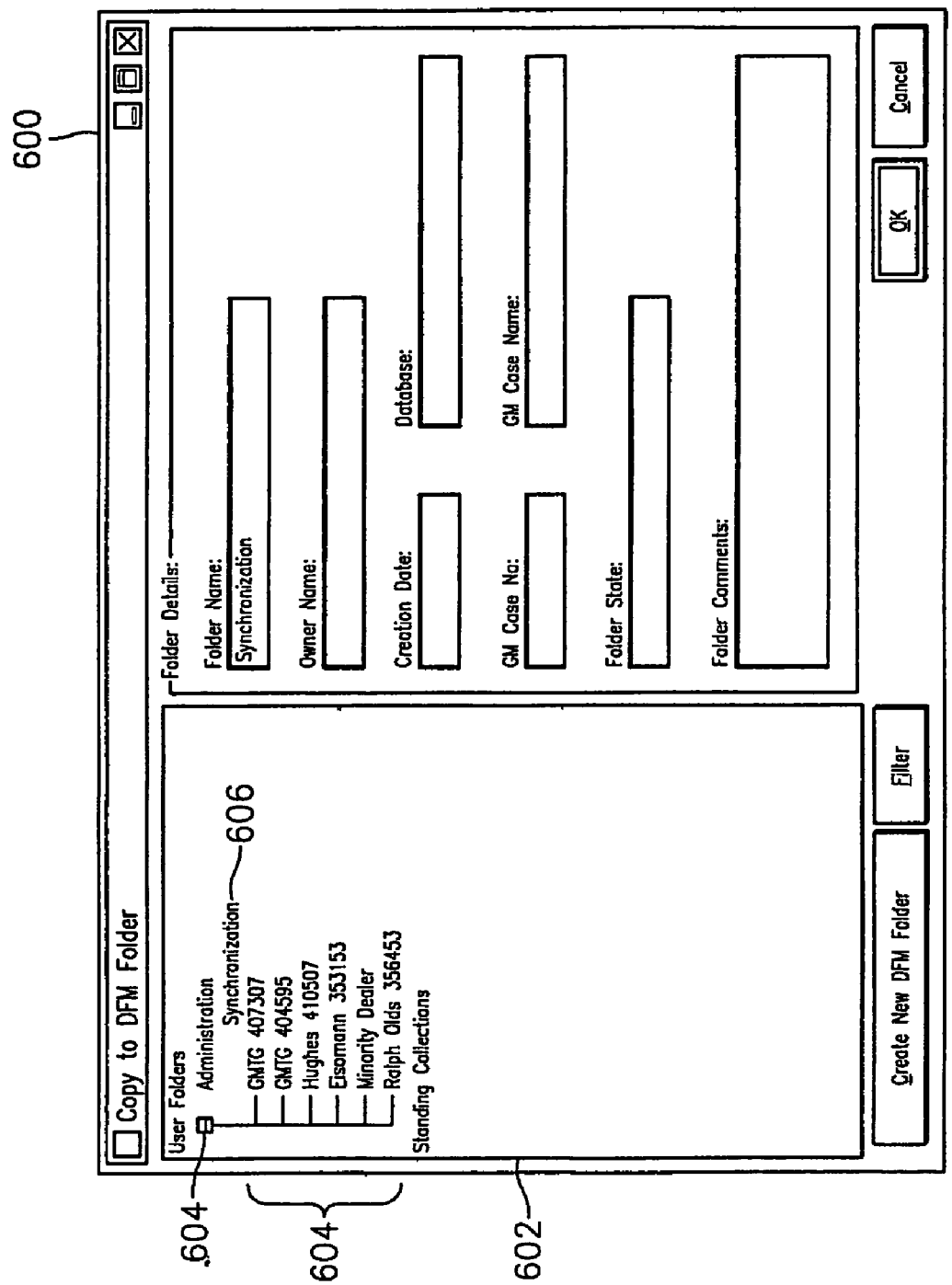
FIG. 6 is an exemplary user interface screen illustrating the results of copying a composite document to a document folder.

A sample user interface screen illustrating a folder association performed by a user is shown in FIG. 6. User interface screen 600 depicts a user tree 602 with various user folders 604 that include an 'administration' folder. Each of the user folders is assigned to individual LSA system users and/or user groups. Within the administration folder, a synchronization folder 606 is displayed, representing a folder that has been copied. As referred to in FIG. 6, a standing collection is a group of data, documents and other information related to a particular subject matter (e.g., a product line, a case matter, an allegation type, a data range, a business transaction, or any other grouping of particular interest).

Referring back to FIG. 4, other functions (e.g., print document 412 and document image 414) may be performed on composite documents and their components via the subwindow 406 in FIG. 4. In addition, other functions (e.g., apply protection and privilege treatments, propose privilege, propose to add or change privilege treatments and apply a production decision) may be performed once the document image is displayed. The flowchart of FIG. 7 describes a process for performing these functions. To initiate any of these functions, at 702, the user first selects a document upon which a function is to be performed as described previously in reference to FIG. 4. Next, at 704, the user selects a function to be performed (e.g., via the subwindow 406 in FIG. 4) as described previously in reference to FIG. 4 or the user selects a function via a toolbar when viewing the document image.

Figure 7:
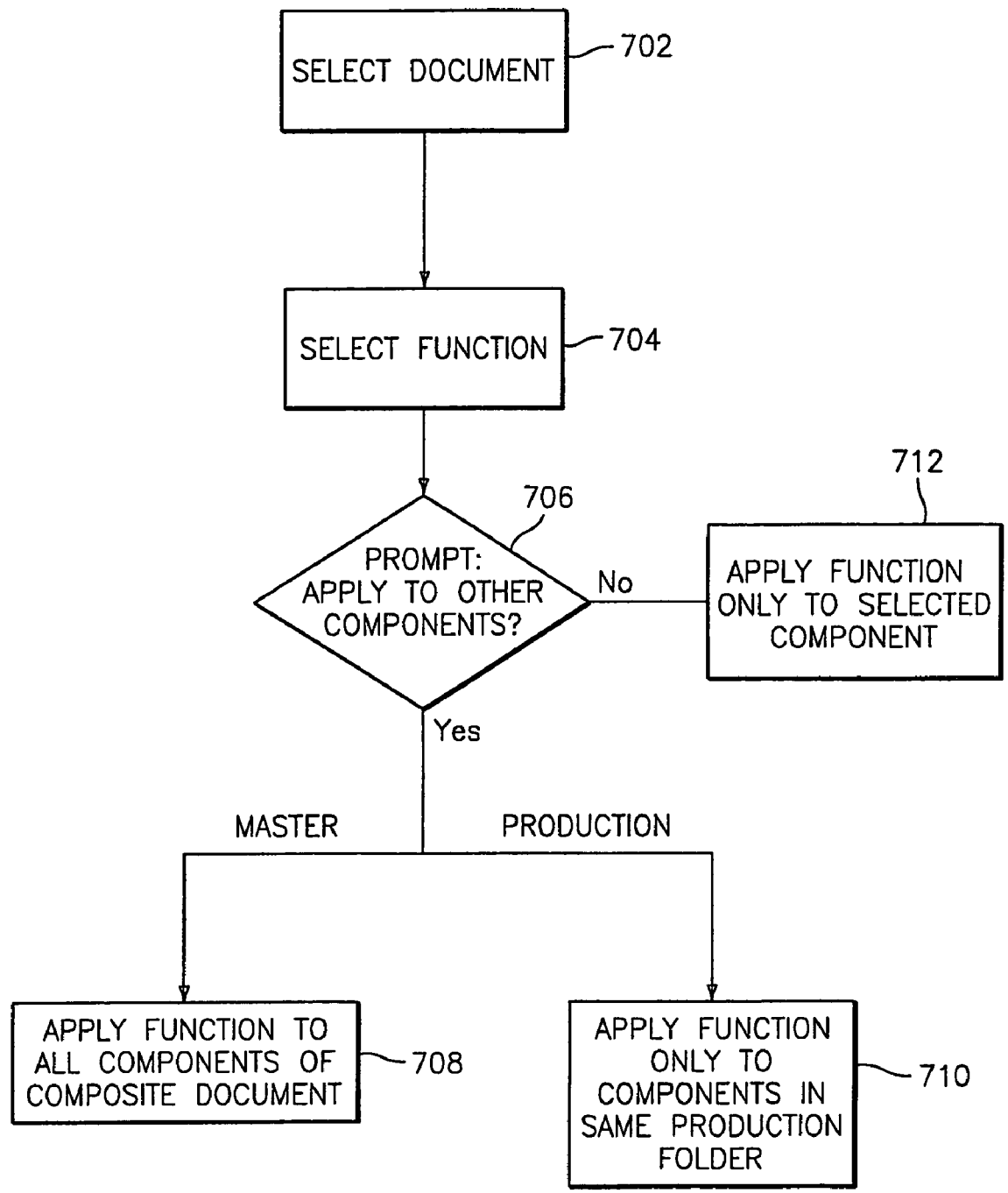
FIG. 7 is an exemplary flowchart describing a process for performing functions on a composite document.

At 706 in FIG. 7, the LSA prompts the user to determine whether to apply the function to other document components (e.g., one or more of components (also referred to as individual documents) of the composite document to which the selected document belongs). If the user specifies that the function is to be applied to other components, one of two actions is performed, depending upon the nature of document selected. If the selected document is a master instance, the LSA will apply the function to all components of the composite document at 708. If the selected document is a production instance, the LSA will apply the function to only those components in the same production folder as the production document at 710. This is because the documents in a production folder have been produced or proposed for production. Because some of the components of the composite document may not have been proposed or produced, these documents will not be included in the association. Returning back to 706, if the user specifies that the function is not to be applied to other components, the LSA will apply the function to only the selected component document at 712. The process described in FIG. 7 will now be described with respect to specific functions selected by a user.

If the user selects print document 412 from the subwindow 406 in FIG. 4, the selected document is printed and if the selected document is part of a composite document, an option to print other individual documents from the composite is presented to the user. If the document is a composite document, then the user is prompted at 706 to determine if the user wants to print other parts of the composite document. If the user wants to print other components and the selected document is a master document, then 708 is performed and the other individual documents, or components, in the composite document are printed along with the selected document. If the user wants to print other components and the selected document is a production document, then 710 is performed and the other individual documents in the production folder that are from the same composite document are printed along with the selected document.

If the user selects document image 414 from the subwindow 406 in FIG. 4, the selected document is viewed and if the selected document is part of a composite document, an option to view other individual documents from the composite is presented to the user. The LSA prompts the user in accordance with the nature of the document selected (e.g., master instance or production instance). If the document selected by the user is a master instance, the prompt might include "Document (accession range) is part of composite document (attachment range). Do you want to open the other parts of the composite document in the document image viewer?" If the user replies 'yes', the LSA loads all components of the composite document into a document image viewer at 708. If the document selected by the user is a production instance, the prompt might include "Document (accession range) is part of a composite document (attachment range), but all other parts may not exist in the same production folder. Do you want to open the other parts of the composite document that are in the same production folder in the document image viewer?" If the user responds 'yes', the LSA loads only the documents that are associated with the same production folder as the selected document at 710. If the user responds 'no' to the prompt of 706, the LSA will load only the selected document into the document image viewer at 712. A sample document image is shown in FIG. 8.

In exemplary embodiments of the present invention, once a document is loaded into the document image viewer, a user may perform functions such as apply protection and privilege treatments; propose privilege; propose to add or change privilege treatments; and apply a production decision. These functions may be performed to the selected document and/or related component documents of a composite document and will follow the process depicted in FIG. 7.

Figure 8:
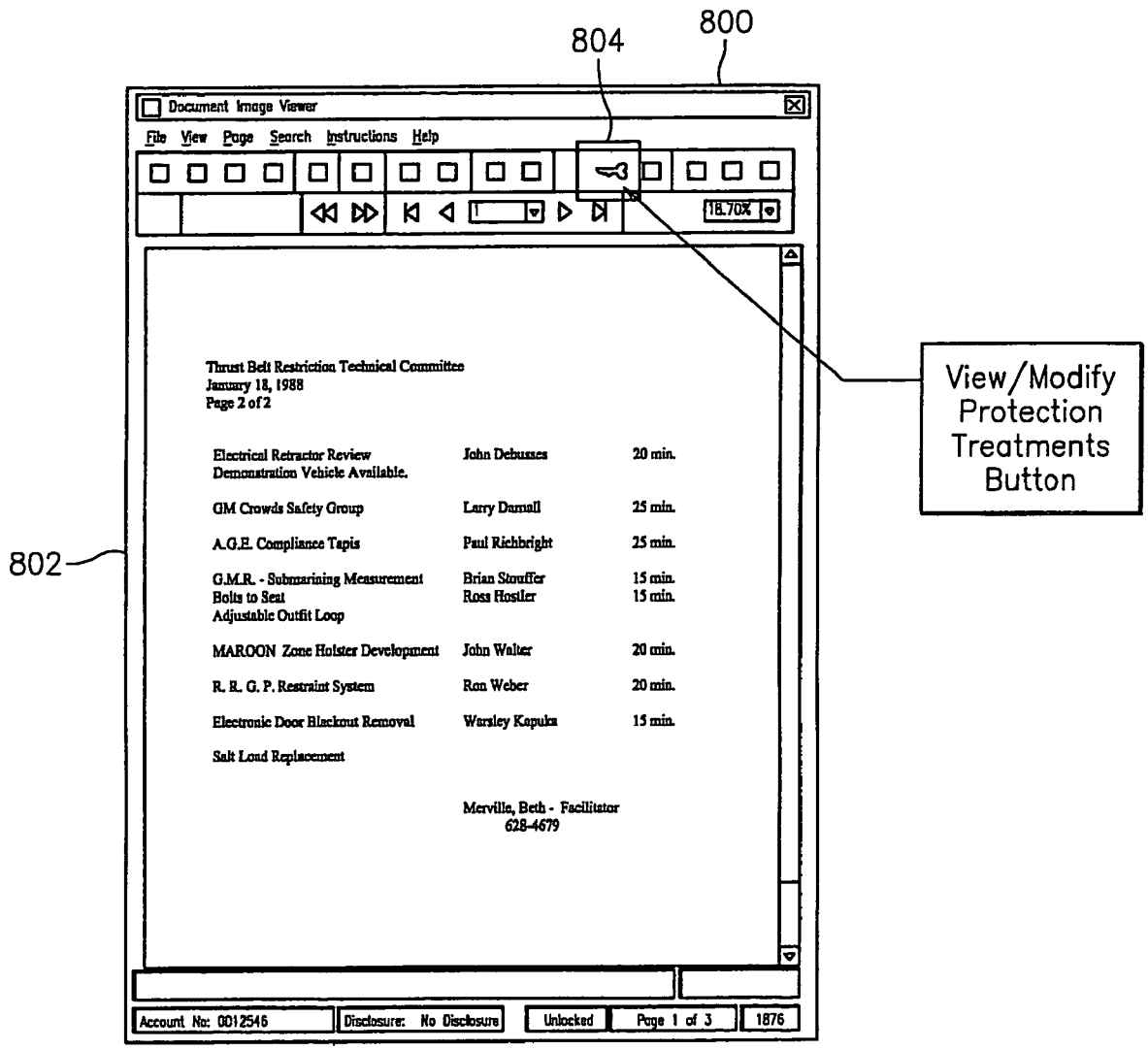
FIG. 8 is an exemplary user interface screen for viewing a document image.
Figure 9:
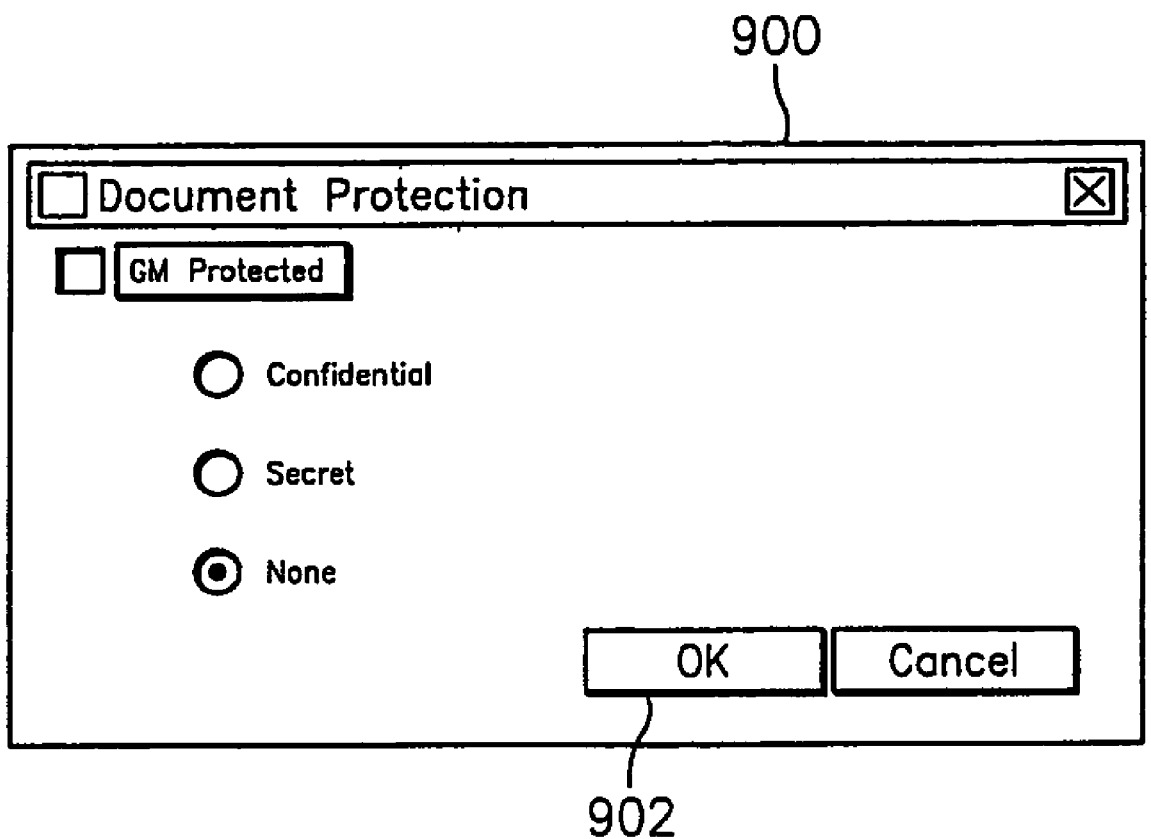
FIG. 9 is an exemplary user interface screen for applying protections to a document.

The user may apply protection and protection treatments to a document by selecting a protection treatments button 804 in the user interface screen 800 of FIG. 8. The LSA then prompts the user with a dialog box at 706 (e.g., for a master instance, "Document (accession range) is part of a composite document (attachment range). Do you want to apply the same level of protection to the other parts of the composite document?" For a production instance, the prompt may be "Document (accession range) is part of a composite document (attachment range) but all other parts may not exist in the same production folder. Do you want to apply protection to the other parts of the composite document that are in the same production folder?"). If the user replies 'yes', the LSA presents a document protection screen 900 as shown in FIG. 9. As shown in FIG. 9, a user selects the 'protected' checkbox to specify that the document is assigned a protected status. The user may further select an additional protection category if desired (e.g., secret or confidential). To apply the treatment, the user then selects 'OK' 902. If the document is a master instance, the LSA will apply the protection selected in FIG. 9 to all component documents at 708. If the document is a production instance, the LSA will apply the protection selected in FIG. 9 to the documents that are in the same production folder as the selected document at 710. If the user indicates that other components should not be assigned the treatment, the LSA will apply the treatment only to the selected document at 712.

Composite documents and their components may also be assigned proposed privilege categories (e.g., privileged, unprivileged) and proposed privilege treatments (e.g., ACP, AWPD) by a user. When a privilege category or treatment is proposed, it may undergo administrative review and approval before it is applied or committed (e.g., made permanent). Thus, a proposed privilege category or treatment may be saved in storage pending this approval.

A user proposes a privilege category (e.g., privileged, non-privileged, partially privileged) to a document via the document image viewer. If the selected document is a master instance, the LSA prompts the user at 706 with "Document (accession range) is part of composite document (attachment range). Do you want to propose privilege to the other parts of the composite document?" If the user replies 'yes', the LSA will propose privilege to the other components of the composite document at 708. If the document is a production instance, the LSA may prompt the user with "Document (accession range) is part of a composite document (attachment range) but all other parts may not exist in the same production folder. Do you want to want to propose privilege to the other parts of the composite document that are in the same production folder?" If yes, the LSA assigns the privilege category or treatment to the other individual documents within the composite document in the same production folder at 710. If the user replies 'no', the LSA will propose privilege to the selected document only at 712. The documents are then flagged to reflect that they are pending a change in privilege status. In exemplary embodiments of the present invention, the proposed privilege category or treatment is associated with the document by updating values in the document table 202 so that systems and users that access the document are notified of the proposed privilege category or treatment. Fields in the document table 202 and privilege/treatments table 212 are updated to reflect the proposed category or treatment.

A user may propose to add or change a privilege treatment to a document via the document image viewer. For example, a user may modify the privilege treatment of a document (e.g., to change the privilege treatment from to AWPD to ACP) or may add a privilege treatment to a document (e.g., add ACP to a document with an existing treatment of AWPD). If the document is a master instance, the LSA prompts the user at 706 with "Document (accession range) is part of composite document (attachment range). Do you want to propose to add this privilege treatment to the other privileged parts of the composite document?" If the user replies 'yes', the LSA will propose the privilege treatment to only those documents that are privileged at 708. If the user replies 'no', the LSA will propose the privilege treatment to the selected document only at 712. If the document is a production instance, the LSA may prompt the user with "Document (accession range) is part of a composite document (attachment range) but all other parts may not exist in the same production folder. Do you want to want to propose to add or change this privilege treatment to the other privileged parts of the composite document that are in the same production folder?" If the user replies 'yes', the LSA will propose the privilege treatment to those documents that are privileged at 710. The document table 202 and privilege/treatments table 212 are updated to reflect the proposed modification. In addition, any records in the production document table 206 that correspond to the document are updated to reflect the proposed modification.

A user may apply a production decision to a document via the document image viewer using a production decision user interface screen 1000 such as the one depicted in FIG. 10. The production decision user interface screen 1000 enables a user to make production decisions for all of the documents being associated to a production folder. When associating a document folder into a production folder, four production decisions are available: individual review (no decision), hold without review, do not produce without review, and produce without review. By selecting individual review, the decision to produce is postponed during the association process. The decision may be made at a later time. When a user selects 'hold without review', a decision to hold the documents is assigned with a description of the hold reason and the person for whom the documents are held. Selecting the 'produce without review' option will assign a decision to produce all of the documents. 'Do not produce without review' causes a decision to be assigned that results in all of the documents being held without production.

Exemplary embodiments of the present invention provide a set of canned reports such as a pending privilege report, a document privilege status report, a produced documents report, and a production decision review report, to name a few. Additional reports may be created using ad hoc reporting tools to create reports to run against any of the fields in the tables depicted in FIG. 2.

Exemplary embodiments of the present invention include managing composite documents in support of litigation. Individual documents that comprise a composite document are coded upon receipt by an entity. Each of the components that constitute a composite document are assigned a unique accession range but will share a common attachment range. By coding the documents in this manner, the entity is able to perform various functions on the composite document and/or its individual components.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A system for electronically managing documents, comprising: a repository of electronically stored individual documents, collections of the individual documents having been attached together as composite documents prior to being stored in the repository as individual documents; a search tool for locating one of the individual documents associated with a corresponding composite document; and a selection tool for selecting a function to be applied to the individual document located, the selection tool including an option to apply to function to at least one other of the individual documents associated with the corresponding composite document.

2. The system of claim 1 wherein the function includes one or more of copying, associating, printing and viewing.

3. The system of claim 1 wherein the function includes one or more of applying protection, proposing a privilege category, proposing a privilege treatment, applying a production decision and reporting.

4. A method for managing documents, comprising:
separating individual documents that have initially been attached together as a composite document;
storing the individual documents;
maintaining an association of the individual documents that have initially been attached together as the composite document;
locating one of the individual documents;
automatically notifying a user that the individual document located is associated with at least one other individual document, wherein the individual document located with the at least one other individual document were initially attached together as the composite document;
applying a function to the individual document located; and
optionally applying the function to the at least one other individual document associated with the individual document located.

5. The method of claim 4 wherein the notifying includes providing a listing of the individual documents that are associated.

6. The method of claim 4 further comprising assigning one or more attributes to the individual documents, the attributes unrelated to the associations of the individual documents.

7. The method of claim 6 further comprising searching the individual documents based on the attributes.

8. The method of claim 4, wherein the function include copying at least one of a text or image.

9. The method of claim 4, wherein at least one of the individual documents that are associated has a master instance and a production instance, the production instance indicating at least one of a production and proposed production for the at least one of the individual documents.

10. The method of claim 9, wherein the production instance is stored in a production folder.

11. The method of claim 4, wherein the function includes viewing at least one of a text or image.

12. The method of claim 4, wherein the function includes printing at least one of a text or image.

13. The method of claim 4, wherein the function includes associating at least one of a text or image.

14. The method of claim 4, wherein the function includes applying a privilege category to at least one of a text or image.

15. The method of claim 14, wherein the privilege category includes a privileged status and a non-privileged status.

16. The method of claim 4, wherein the performing the function includes applying a privilege treatment to at least one of a text or image.

17. The method of claim 16, wherein the privilege treatment includes one or both of attorney client privilege and attorney work product doctrine.

18. The method of claim 4, wherein the function includes applying a protection treatment to at least one of a text or image.

19. The method of claim 18, wherein the protection treatment includes a protected status and an unprotected status, wherein said protected status further includes a secret status and a confidential status.

20. The method of claim 4, wherein the function includes adding or changing a privilege treatment to at least one of a text or image.

21. The method of claim 4, wherein the function includes applying a production decision to at least one of a text or image.

22. The method of claim 21, wherein the production decision is selected from a list comprising:
individual review;
hold without review;
do not produce without review; and
produce without review.

23. A system for managing composite documents, the system comprising a host system, the host system including instructions to implement a method comprising:
separating individual documents that have initially been attached together as a composite document;
storing the individual documents:
maintaining an association of the individual documents that have initially been attached together as the composite document;
locating one of the individual documents;
automatically notifying a user that the individual document located is associated with at least one other individual document wherein the individual document located and the at least one other individual document were initially attached together as the composite document;
applying a function to the individual document located; and
optionally applying the function to the at least one other individual document associated with the individual document located.

24. The system of claim 23 wherein the notifying includes providing a listing of the individual documents that are associated.

25. The system of claim 23 further comprising assigning one or more attributes to the individual documents, the attributes unrelated to the associations of the individual documents.

26. The system of claim 25 further comprising searching the individual documents based on the attributes.

27. The system of claim 23, wherein the function includes copying at least one of a text or image.

28. The system of claim 23, wherein at least one of the individual documents that are associated has a master instance and a production instance, the production instance indicating at least one of a production and proposed production for the at least one of the individual documents.

29. The system of claim 28, wherein the production instance is stored in a production folder.

30. The system of claim 23, wherein the function includes viewing at least one of a text or image.

31. The system of claim 23, wherein the function includes printing at least one of a text or image.

32. The system of claim 23, wherein the function includes associating at least one of a text or image.

33. The system of claim 23, wherein the function includes applying a privilege category to at least one of a text or image.

34. The system of claim 33, wherein the privilege category includes a privileged status and a non-privileged status.

35. The system of claim 23, wherein the performing the function includes applying a privilege treatment to at least one of a text or image.

36. The system of claim 35, wherein the privilege treatment includes one or both of attorney client privilege and attorney work product doctrine.

37. The system of claim 23, wherein the function includes applying a protection treatment to at least one of a text or image.

38. The system of claim 37, wherein the protection treatment includes a protected status and an unprotected status, wherein said protected status further includes a secret status and a confidential status.

39. The system of claim 23, wherein the function includes adding or changing a privilege treatment to at least one of a text or image.

40. The system of claim 23, wherein the function includes applying a production decision to at least one of a text or image.

41. The system of claim 40, wherein the production decision is selected from a list comprising:
    individual review;
    hold without review;
    do not produce without review; and
    produce without review.

42. A computer program product for managing privileged documents, the computer program product comprising:
    a storage medium readable by a processing circuit and storing instructions for execution by the processing circuit for performing a method comprising:
    separating individual documents that have initially been attached together as a composite document;
    storing the individual documents:
    maintaining an association of the individual documents that have initially been attached together as the composite document;
    locating one of the individual documents;
    automatically notifying a user that the individual document located is associated with at least one other individual document, wherein the individual document located and the at least one other individual document were initially attached together as the composite document;
    applying a function to the individual document located; and
    optionally applying the function to the at least one other individual document associated with the individual document located.

* * * * *